United States Patent
Bezdek

(10) Patent No.: US 8,527,159 B2
(45) Date of Patent: Sep. 3, 2013

(54) AUTOMATIC TRANSMISSION ACTUATORS AND SENSORS HAVING INTEGRATED ELECTRONICS

(75) Inventor: Steven Mark Bezdek, Haslett, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 933 days.

(21) Appl. No.: 12/042,702

(22) Filed: Mar. 5, 2008

(65) Prior Publication Data

US 2009/0143947 A1 Jun. 4, 2009

Related U.S. Application Data

(60) Provisional application No. 60/991,417, filed on Nov. 30, 2007.

(51) Int. Cl.
  *G06F 7/00* (2006.01)
  *G06F 17/00* (2006.01)
  *G06F 19/00* (2011.01)

(52) U.S. Cl.
  USPC ............ 701/51; 701/53; 477/34; 180/337

(58) Field of Classification Search
  USPC ............ 701/51–66; 477/34, 36, 97, 115; 475/1, 6, 329; 180/313, 337, 344
  See application file for complete search history.

(56) References Cited

U.S. PATENT DOCUMENTS

| 7,503,876 | B2 * | 3/2009 | Kitamura et al. | 477/125 |
|---|---|---|---|---|
| 7,601,088 | B2 * | 10/2009 | Sinojima et al. | 475/216 |
| 7,610,137 | B2 * | 10/2009 | Kwon | 701/51 |
| 2002/0007979 | A1 | 1/2002 | Wilson | |
| 2002/0111730 | A1 * | 8/2002 | Thorum et al. | 701/51 |
| 2004/0107378 | A1 * | 6/2004 | Guenther | 713/600 |
| 2004/0261570 | A1 | 12/2004 | Suzuki et al. | |
| 2006/0169516 | A1 * | 8/2006 | Masuya et al. | 180/246 |
| 2007/0275810 | A1 | 11/2007 | Sinojima et al. | |
| 2008/0059038 | A1 * | 3/2008 | Yoshida et al. | 701/99 |

FOREIGN PATENT DOCUMENTS

DE 10057091 A1 5/2002

* cited by examiner

*Primary Examiner* — Jack W. Keith
*Assistant Examiner* — Rami Khatib

(57) ABSTRACT

An electronic-hydraulic controller for an automatic transmission includes a transmission control module (TCM) which is disposed outside the transmission housing and is connected to the actuators, sensors and switches within the transmission by a serial data link such as the car area network (CAN). Electrical power is also provided to the components within the transmission resulting in a connector requiring only five or six terminals. Each of the actuators, sensors and switches includes its own integrated electronic circuitry which receives, stores and provides data and allows it to communicate through the serial data link with the externally mounted control module. The electronic circuitry of each actuator stores data regarding its input signal to output pressure and flow characteristics which facilitates replacement of the transmission control module.

24 Claims, 2 Drawing Sheets

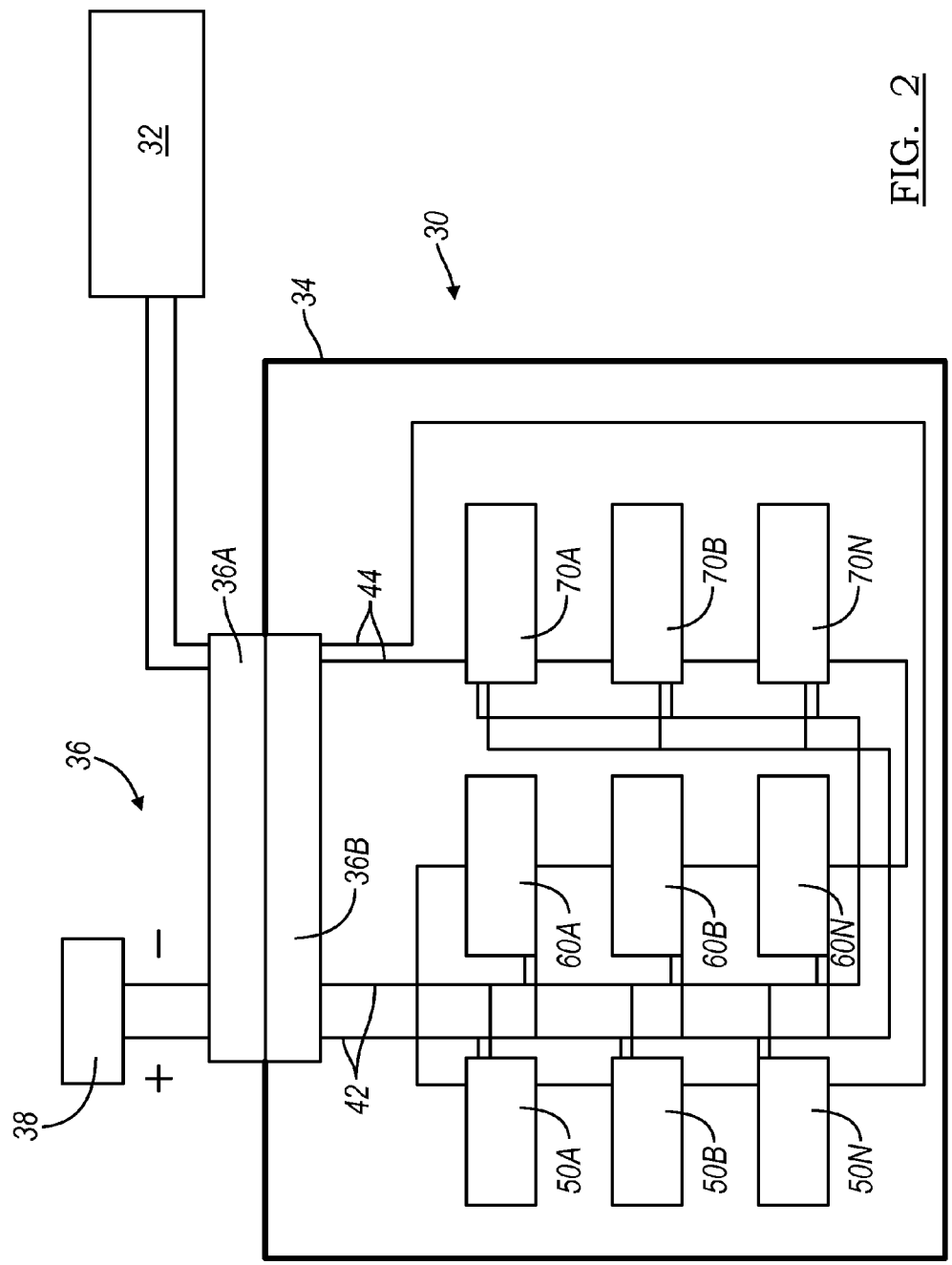

US 8,527,159 B2

AUTOMATIC TRANSMISSION ACTUATORS AND SENSORS HAVING INTEGRATED ELECTRONICS

CROSS-REFERENCE TO RELATED APPLICATIONS

This application claims the benefit of U.S. Provisional Application Ser. No. 60/991,417, filed Nov. 30, 2007. The disclosure of the above application is incorporated herein by reference.

FIELD OF THE INVENTION

The present disclosure relates to actuators and sensors and more particularly to actuators and sensors having integrated electronics for use with vehicular automatic transmissions and the like.

BACKGROUND

The statements in this section merely provide background information related to the present disclosure and may or may not constitute prior art.

Early automatic transmissions were hydro-mechanical devices in which varying hydraulic pressure developed within the transmission was utilized to sequence a plurality devices that controlled rotating members which achieved two, three or four forward gear ratios or speeds.

As the complexity of these transmissions increased, primarily in response to the demand for more gear ratios, electronic-hydraulic controllers were utilized. These devices received a plurality of signals from various sensors both inside and outside the transmission and commanded gear ratio selection based not only upon the sensed operating conditions by also programs, algorithms and data stored within the controller.

While providing greatly improved operating flexibility, such electronic-hydraulic controllers are not without their drawbacks. First of all, such controllers are typically mounted within the transmission where they are subjected to vibration and relatively high temperatures. Second of all, electrical power, data from external sensors and all other control circuits necessarily pass through the transmission housing, typically in a multiple conductor connector assembly. Not only does this connector represent a significant cost, it also can be a source of electrical problems resulting from intermittent or failed connections.

Thirdly, automatic transmission actuators and solenoid valves are often characterized, that is, their input power versus output pressure and flow is determined and such individualized data is stored in the electronic-hydraulic controller. If a component of the controller fails, it is generally standard practice to replace the controller. Not only is this practice expensive but it also requires that all the actuator or solenoid valve characterization data be restored in the new controller. If the controller failure is partial, it may be possible to recover and transfer the characterization data. If the failure is complete or essentially so, it will be necessary for the replacement controller to relearn the various characterizations through a relatively time consuming process.

Thus it is apparent that improvements in the art of electronic-hydraulic transmission controllers which address these drawbacks would be desirable and the present invention is so directed.

SUMMARY

The present invention provides an electronic-hydraulic controller for an automatic transmission having a transmission control module (TCM) which is disposed outside the transmission housing and is connected to the actuators, sensors and switches within the transmission by a serial data link such as the car area network (CAN). Electrical power is also provided to the components within the transmission resulting in a connector requiring only five or six terminals. Each of the actuators, sensors and switches includes its own integrated electronic circuitry which receives, stores and provides data and allows it to communicate through the serial data link with the externally mounted control module. The electronic circuitry of each actuator stores its characterization data, i.e., its signal input to output flow and pressure characteristics, which are therefore not lost when the controller is replaced. Such characterization data is necessary because the control system is open loop and in order to provide optimum operation, it is necessary to apply to an actuator solenoid coil that amount of power which will provide a known and intended hydraulic flow and pressure output.

Thus it is an object of the present invention to provide an improved electronic-hydraulic controller for an automatic transmission.

It is a further object of the present invention to provide an electronic-hydraulic controller having a control module which is disposed outside the housing of the automatic transmission.

It is a still further object of the present invention to provide actuators, sensors and switches for an automatic transmission having integrated electronic circuitry.

It is a still further object of the present invention to provide an electronic-hydraulic controller for an automatic transmission which is connected to a plurality of actuators, sensors and switches by a serial data link.

It is a still further object of the present invention to provide actuators for an automatic transmission having integrated electronic storage capability for characterization data.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a schematic diagram of controller architecture of an automatic transmission according to the present invention.

DETAILED DESCRIPTION

The following description is merely exemplary in nature and is not intended to limit the present disclosure, application, or uses.

Figure 1:
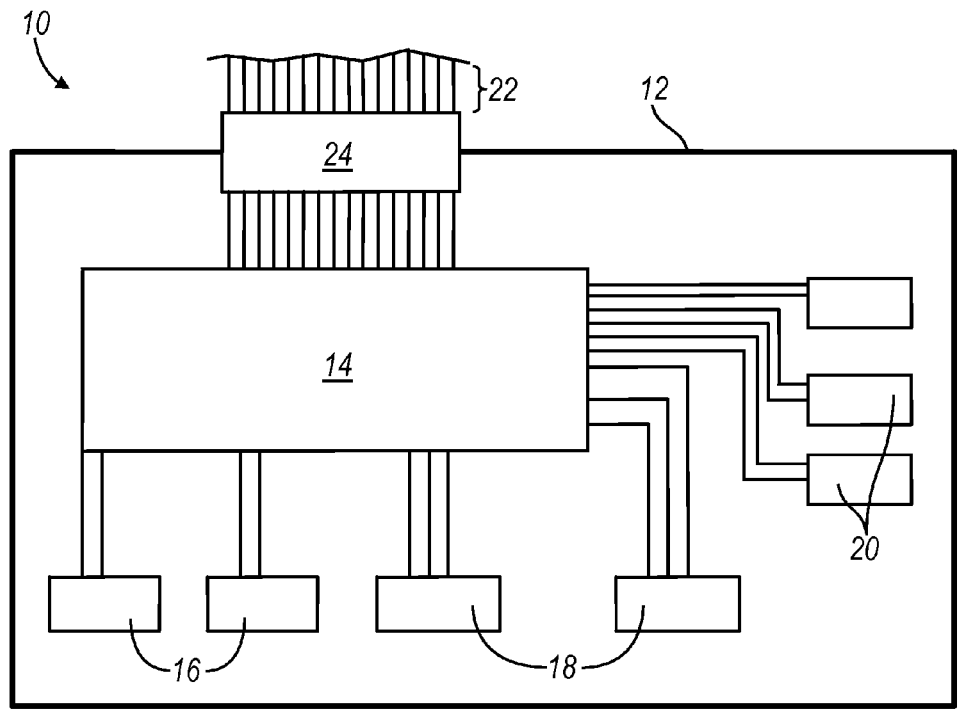
FIG. 1 is a schematic diagram of prior art controller architecture of an automatic transmission.

With reference to FIG. 1, a schematic diagram of controller architecture of a prior art automatic transmission assembly is illustrated and generally designated by the reference number 10. The prior art automatic transmission assembly 10 includes a transmission housing 12 which encloses and protects all of the various components of the transmission such as shafts and gears, including the electronic control module 14.

The electronic control module 14 includes one or more microprocessors, input and output buffers and storage devices (all not illustrated) and is hardwired to a plurality of actuators 16, a plurality of sensors 18 and a plurality of switches 20. Additionally, electrical power and various data signals from components in the motor vehicle (not illustrated) are provided through a plurality of electrical wires 22 to the electronic control module 14 through a multiple conductor connector assembly 24 mounted in the housing 12.

Referring now to FIG. 2, a schematic diagram of controller architecture of an automatic transmission according to the present invention is illustrated and generally designated by the reference number 30. The automatic transmission controller 30 according to the present invention includes a transmission control module 32 which is disposed outside a transmission housing 34 of an automatic transmission in a location preferably removed from the heat, vibration and generally undesirable conditions for electronic components which exist within the transmission housing 34. The transmission control module 32 may be a portion of or integrated into other vehicle electronics located under the hood or in the passenger compartment. A connector assembly 36 includes a multiple conductor releasable plug 36A hardwired to a source or electrical power such as a battery 38 and a serial data communication link or bus such as the car area network (CAN) which communicates with the output of the transmission control module 32. The connector assembly 36 also includes a multiple conductor socket 36B which is mounted in and sealingly secured to the transmission housing 34. It is anticipated that the connector assembly 36 will carry only five or six circuits and will thus include only ten or twelve terminals, a reduction of 50 to 75 percent from current, prior art designs.

The terminals of the multiple conductor socket 36B are, in turn, hardwired to a plurality of components within the transmission housing 34. Specifically, both electrical power from the battery 38 in the lines or conductors 42 and the data or signals from the serial data link generated in the automatic transmission control module 32 in the lines or conductors 44 are provided to a first plurality of electrohydraulic actuators 50A, 50B through 50N. Each of the actuators 50A, 50B through 50N may be associated with, for example, a particular hydraulic torque transmitting device such as a clutch or a brake (both not illustrated). Similarly, the electrical lines or conductors 42 and the data lines or conductors 44 provide, respectively, electrical power to and data signals from a plurality of switches 60A, 60B through 60N. Each of the switches 60A, 60B through 60N may be associated with, for example, a particular transmission component to provide an indication or signal regarding its position or positions. Finally, the electrical lines or conductors 42 and the data lines or conductors 44 provide, respectively, electrical power to and data signals from a plurality of sensors 70A, 70B through 70N. Each of the plurality of sensors 70A, 70B through 70N may be associated with, for example, a particular transmission component, orifice, location or passageway to provide a signal or data regarding a particular operating condition such as, for example, position, pressure or temperature.

It should be appreciated that each of the plurality of electrohydraulic actuators 50A, 50B through 50N, each of the plurality of switches 60A, 60B through 60N and each of the plurality of sensors 70A, 70B through 70N include electronic circuitry which codes or converts their signals for transmission in the data line or conductors 44 to the serial data link input of the transmission control module 32.

It should also be appreciated that the above description of the electrohydraulic actuators 50A, 50B through 50N, the switches 60A, 60B through 60N and the sensors 70A, 70B through 70N is by way of illustration and description only and that more or fewer such components may be utilized in any particular automatic transmission controller 30.

Figure 3:
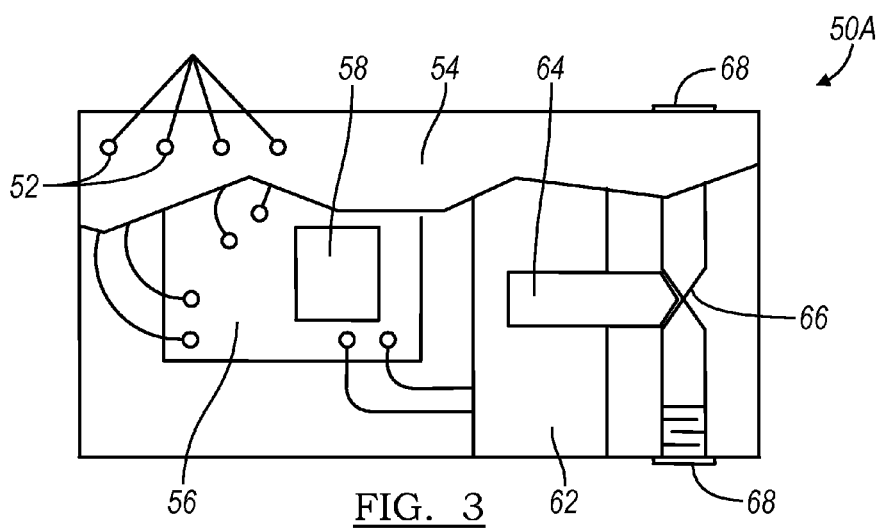
FIG. 3 is an enlarged view of an automatic transmission electrohydraulic actuator having integrated electronic circuitry according to the present invention.

Referring now to FIG. 3, a typical and exemplary electrohydraulic actuator 50A is illustrated. The electrohydraulic actuator 50A includes terminals or connectors 52 extending through a housing 54 for the electrical lines or conductors 42 and the data lines or conductors 44. Within the housing 54 of the electrohydraulic actuator 50A is an electronic module or control circuitry 56 including a memory or data storage device 58 into which data regarding the individual power input versus output flow and pressure characteristics of the electrohydraulic actuator 50A are stored. These characteristics are referred to herein as the characterization of the particular electrohydraulic actuator. As noted above, it is necessary to store and have available such characterization data because the control system is an open loop configuration and in order to provide optimum transmission operation, it is necessary to apply to an actuator solenoid coil that amount of power which will provide a known and intended hydraulic flow and pressure output. The electrohydraulic actuator 50A also includes a solenoid coil 62 operatively associated with a plunger 64 which opens and closes an on-off or, more typically, a modulating hydraulic fluid control valve 66 having inlet and outlet ports 68.

It will thus be appreciated that an automatic transmission controller 30 according to the present invention provides a lower cost assembly because it utilizes a less complex transmission control module 32 and fewer wires entering the transmission and thus a smaller pass-through connector on the transmission housing 34. Additionally, manufacturing complexity is reduced and product flexibility is increased because no product software is embedded in a control module within the transmission. Furthermore, since actuator characterization data are stored in the individual memory of the actuator, transmission service is simplified because no data is lost when the transmission control module is replaced. Finally, the invention improves design flexibility since design and engineering of the actuators and sensors may be accomplished independently of and on a distinct development cycle from that utilized for the transmission control module.

The description of the invention is merely exemplary in nature and variations that do not depart from the gist of the invention are intended to be within the scope of the invention. Such variations are not to be regarded as a departure from the spirit and scope of the invention.

What is claimed is:

1. A control system for an automatic transmission comprising, in combination,
    a transmission control module having a single serial data link input and a single serial data link output,
    at least one sensor providing data to said input,
    at least one actuator receiving data from said output, said actuator including a memory device,
    a serial data line communication loop interconnecting each of the at least one sensor and each of the at least one actuator, said serial data line communication loop interconnecting said single serial data link input and said single serial data link output; and
    a multiple conductor connector for disposition in a housing of a transmission, said multiple conductor connector providing a connection through said housing between said single serial data link input of said control module and said serial data line communication loop and said single serial data link output of said control module and said serial data line communication loop.

2. The control system for an automatic transmission of claim 1 wherein said memory device stores characterizing data.

3. The control system for an automatic transmission of claim 1 wherein said transmission control module utilizes open loop control.

4. The control system for an automatic transmission of claim 1 further including at least one switch providing data to said input.

5. The control system for an automatic transmission of claim 1 further including a transmission housing and wherein said transmission control module is disposed outside said housing and said at least one sensor and said at least one actuator are disposed inside said housing.

6. The control system for an automatic transmission of claim 1 further including a plurality of said sensors and a plurality of said actuators.

7. The control system for an automatic transmission of claim 1 wherein said multiple conductor connector carries electrical power for distribution to said sensor and said actuator.

8. A control system for an automatic transmission comprising, in combination,
   a transmission control module having a serial data link input and output,
   at least one sensor providing data to said input,
   at least one actuator receiving data from said output, said actuator including a memory device,
   a serial data line communication loop interconnecting each of the at least one sensor and each of the least one actuator; and
   a multiple conductor connector for disposition in a housing of a transmission for providing a connection through said housing between said serial data link input of said control module and said serial data line communication loop and said serial data link output of said control module and said serial data line communication loop,
   wherein the serial data line communication loop further comprises:
   a data line having a first end and a second end,
   wherein said data line is connected at the first end through said multiple conductor connector to said serial data output, said data line is connected in serial connection to each of the at least one sensor and each of the least one actuator, and said data line is connected at the second end through said multiple conductor connector to said serial data input such that each at least one sensor and each of the least one actuator remain connected to at least one of said serial data input or said serial data output even if there is a break in the data line.

9. The control system for an automatic transmission of claim 8 wherein the serial data line communication loop operates without sending a clock signal.

10. A control system for an automatic transmission comprising, in combination,
    a transmission control module having a serial data link input and output,
    at least one switch providing data to said input,
    at least one sensor providing data to said input,
    a plurality of actuators receiving data from said output, said actuators each including a memory device,
    a serial data line communication loop interconnecting each of the at least one switch, each of the least one sensor and each of said plurality of actuators; and
    a multiple conductor connector for disposition in a housing of a transmission for providing a connection between said serial data link input of said control module and said serial data line communication loop and providing a connection between said serial data link output of said control module and said serial data line communication loop,
    wherein the serial data line communication loop further comprises:
    a data line having a first end and a second end,
    wherein said data line is connected at the first end through said multiple conductor connector to said serial data output, said data line is connected in serial connection to each of the at least one switch, each of the least one sensor and each of said plurality of actuators, and said data line is connected at the second end through said multiple conductor connector to said serial data input such that each of the at least one switch, each of the least one sensor and each of said plurality of actuators remain connected to at least one of said serial data input or said serial data output even if there is a break in the data line.

11. The control system for an automatic transmission of claim 10 wherein said memory devices store characterizing data.

12. The control system for an automatic transmission of claim 10 further including a plurality of said switches and a plurality of said sensors.

13. The control system for an automatic transmission of claim 10 wherein said transmission control module utilizes open loop control.

14. The control system for an automatic transmission of claim 10 wherein said multiple conductor connector carries electrical power for distribution to said switch, said sensor and said actuators.

15. The control system for an automatic transmission of claim 10 further including a transmission housing and wherein said transmission control module is disposed outside said housing and said at least one switch, said at least one sensor and said plurality of actuators are disposed inside said housing.

16. The control system for an automatic transmission of claim 10 wherein said switch, said sensor and said plurality of actuators include electronic circuitry for communicating with said transmission control module through said serial data link input.

17. The control system for an automatic transmission of claim 10 wherein the serial data line communication loop operates without sending a clock signal.

18. A control system for an automatic transmission comprising, in combination,
    a transmission control module having a only one serial data link input and only one output,
    at least one switch for providing data to said input,
    at least one sensor for providing data to said input,
    at least one actuator for receiving data from said output, said actuators each including a memory device for storing characterizing data,
    a serial data line communication loop interconnecting each of the at least one switch, each of the least one sensor and each of said at least one actuators; and
    a multiple conductor connector for disposition in a housing of a transmission for providing a connection between said only one serial data link input of said control module and said serial data line communication loop and providing a connection between said only one serial data link output of said control module and said serial data line communication loop,
    wherein the serial data line communication loop further comprises:

a data line having a first end and a second end, wherein said data line is connected at the first end through said multiple conductor connector to said serial data output, said data line is connected in serial connection to each of the at least one switch, each of the least one sensor and each of said at least one actuators, and said data line is connected at the second end through said multiple conductor connector to said serial data input such that each of the at least one switch, each of the least one sensor and each of said at least one actuators remain connected to at least one of said serial data input or said serial data output even if there is a break in the data line.

19. The control system for an automatic transmission of claim 18 wherein said transmission control module utilizes open loop control.

20. The control system for an automatic transmission of claim 18 further including a plurality of said switches, said sensors and said actuators.

21. The control system for an automatic transmission of claim 18 wherein said multiple conductor connector carries electrical power for distribution to said switch, said sensor and said actuator.

22. The control system for an automatic transmission of claim 18 further including a transmission housing and wherein said transmission control module is disposed outside said housing and said at least one switch, said at least one sensor and said at least one actuator are disposed inside said housing.

23. The control system for an automatic transmission of claim 18 wherein said switch, said sensor and said actuator include electronic circuitry for communicating with said transmission control module through said serial data link input.

24. The control system for an automatic transmission of claim 18 wherein the serial data line communication loop operates without sending a clock signal.

\* \* \* \* \*